United States Patent [19]

Chen

[11] Patent Number: 5,310,145
[45] Date of Patent: May 10, 1994

[54] FLOOR LAMP TRIPOD STAND

[76] Inventor: Jason Chen, 5F, No. 130, Sec. 4, Cheng Teh Rd., Taipei, Taiwan

[21] Appl. No.: 963,184

[22] Filed: Oct. 19, 1992

[51] Int. Cl.⁵ .............................................. F16M 11/38
[52] U.S. Cl. .................. 248/170; 248/188.6; 362/413; 403/84
[58] Field of Search ............... 248/188.7, 435, 170, 248/188.6; 403/58, 53, 84, 83; 362/413, 418

[56] References Cited

U.S. PATENT DOCUMENTS 5,060,894 10/1991 Hillinger .............................. 248/170
5,082,222 1/1992 Hsu ..................................... 248/170
5,102,079 4/1992 Lee ..................................... 248/170

Primary Examiner—Ira S. Lazarus
Assistant Examiner—L. Heyman
Attorney, Agent, or Firm—Browdy and Neimark

[57] ABSTRACT

A floor lamp tripod stand includes a socket fastened to a support arm of a floor lamp by a tightening up screw, three legs respectively and pivotably connected to said socket by a pivot pin and a clamp for supporting said support arm on a floor, and three locking plates for locking said legs in any of a series of angular positions on said socket relative to said support arm. Each leg has a top end pivoted to a respective pair of symmetrical wings on the socket and a round rod in an oval hole on the top end retained in either of a series of locating notches on each wing by a spring plate and the respective locking plate. Pressing a finger press portion on either locking plate causes the round rod to be moved from one locating notch to another for permitting the respective leg to be adjusted to any of a series of angular positions on the socket relative to the support arm of said floor lamp.

1 Claim, 5 Drawing Sheets

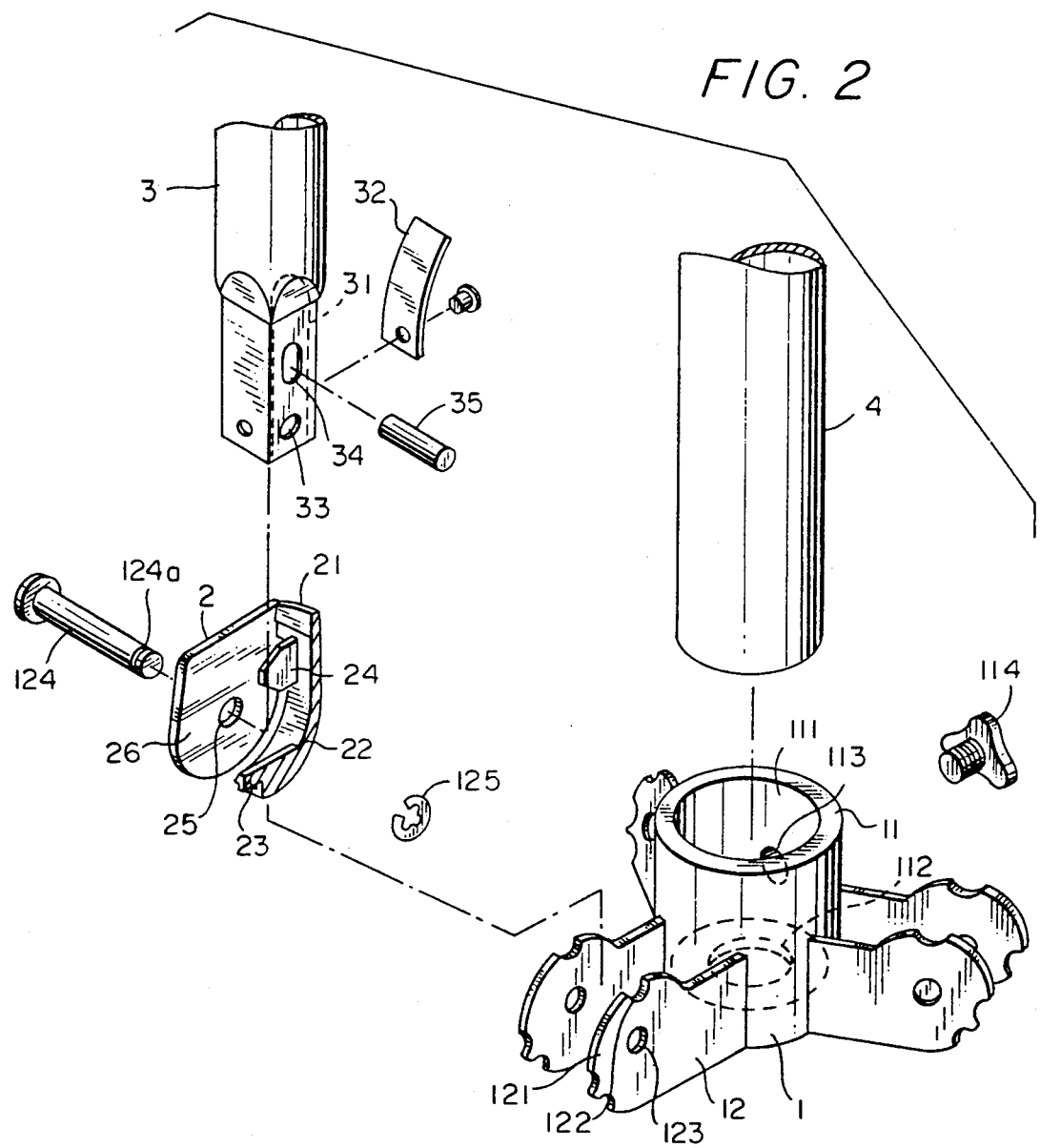

FLOOR LAMP TRIPOD STAND

BACKGROUND OF THE INVENTION

The present invention relates to stands and relates more particularly to a tripod stand for a floor lamp which is easy to manufacture and convenient to assemble and install.

A known floor lamp tripod stand, as shown in FIG. 1, mainly has three connectors 2b fastened to a support arm by a socket 1a and screws 3c to hold three legs (not shown) respectively. However, the use of the screws 3c greatly damages the sense of beauty of the whole assembly; the connectors 2b are complicated to process. The threads of the screws 3c and the screw holes on the connectors 2b and the socket 1a may be damaged easily more particularly after long uses, causing the stand to be unstable. Furthermore, this structure of floor lamp tripod stand is expensive to manufacture and inconvenient to install.

SUMMARY OF THE INVENTION

The present invention has been accomplished under aforesaid circumstances. It is therefore an object of the present invention to provide a floor lamp tripod stand which is inexpensive to manufacture, easy to assemble and install. It is another object of the present invention to provide a floor lamp tripod stand which can be conveniently adjusted to any of a variety of angular positions. It is still another object of the present invention to provide a floor lamp tripod stand which is durable and stable in use. It is still another object of the present invention to provide a floor lamp tripod stand which provides a sense of beauty.

According to the preferred embodiment of the present invention, a floor lamp tripod stand is generally comprised of a socket fastened to a support arm of a floor lamp by a tightening up screw, three legs respectively and pivotably connected to said socket by a pivot pin and a clamp for supporting said support arm on a floor, and three locking plates for locking said legs in any of a series of angular positions on said socket relative to said support arm. Each leg has a top end pivoted to a pair of symmetrical wings of a respective mounting frame on the socket and a round rod in an oval hole on the top end retained in either of a series of locating notches on each wing by a spring plate and the respective locking plate. Pressing a finger press portion on either locking plate causes a pair of symmetrical presser strips to move the round rod of the respective locking plate against the respective curved spring plate for permitting the round rod to be moved from one locating notch on each wing of the respective mounting frame to another in allowing the respective leg to be adjusted to any of a series of angular positions on the socket relative to the support arm of the floor lamp.

BRIEF DESCRIPTION OF THE DRAWINGS

FIG. 2 is a perspective exploded view of a floor lamp tripod stand according to the present invention;

DETAILED DESCRIPTION OF THE PREFERRED EMBODIMENT

Figure 4:
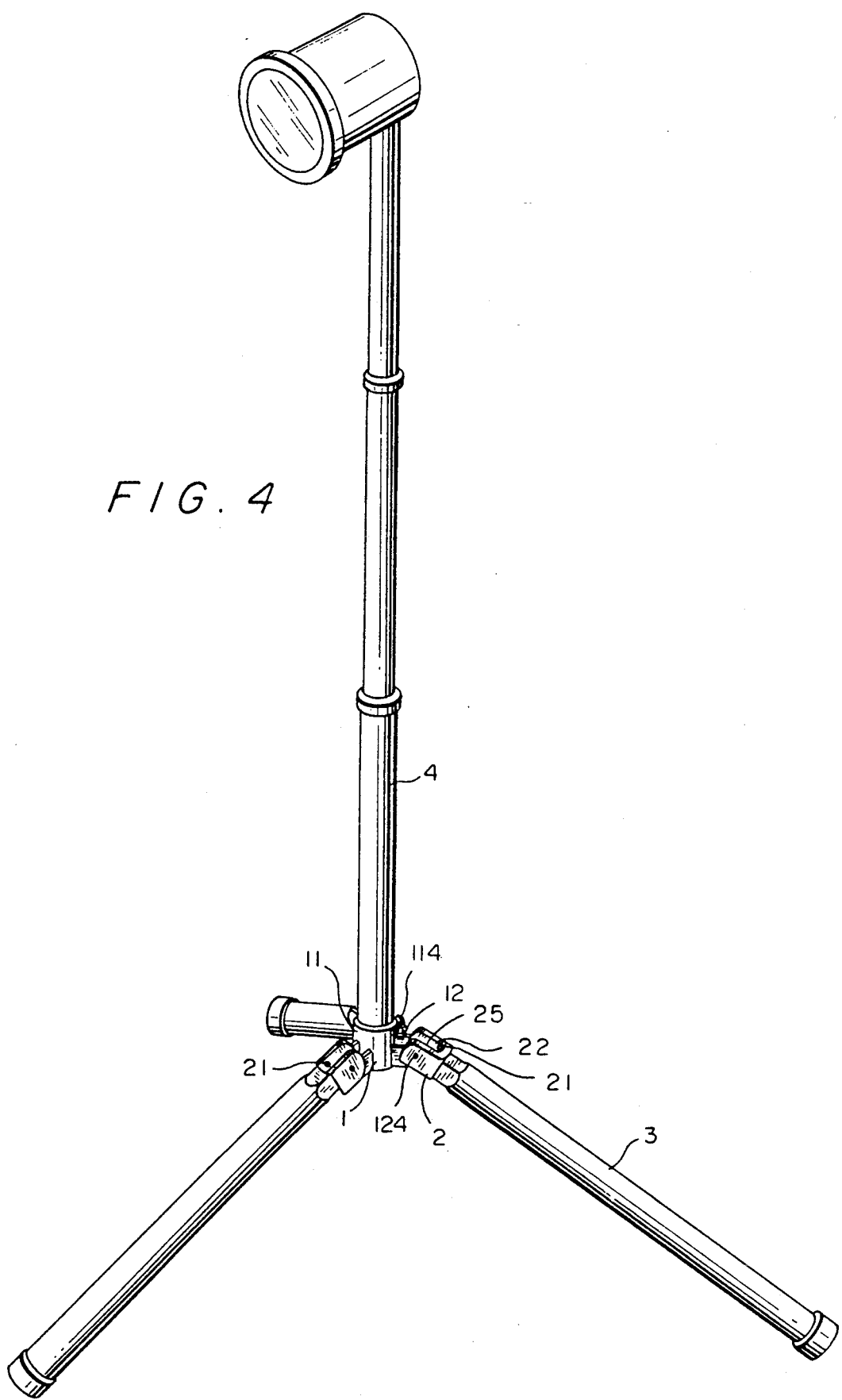
FIG. 4 is an elevational view of a floor lamp supported on the tripod stand of FIG. 2.

Referring to FIG. 4, the support arm 4 of a floor lamp is supported on a tripod stand, which is comprised of a socket 1, three legs 3 respectively and pivotably connected to the socket 1, and three locking plates 2 for locking the legs 3 in any of a series of angular positions on the socket 1.

Figure 1:
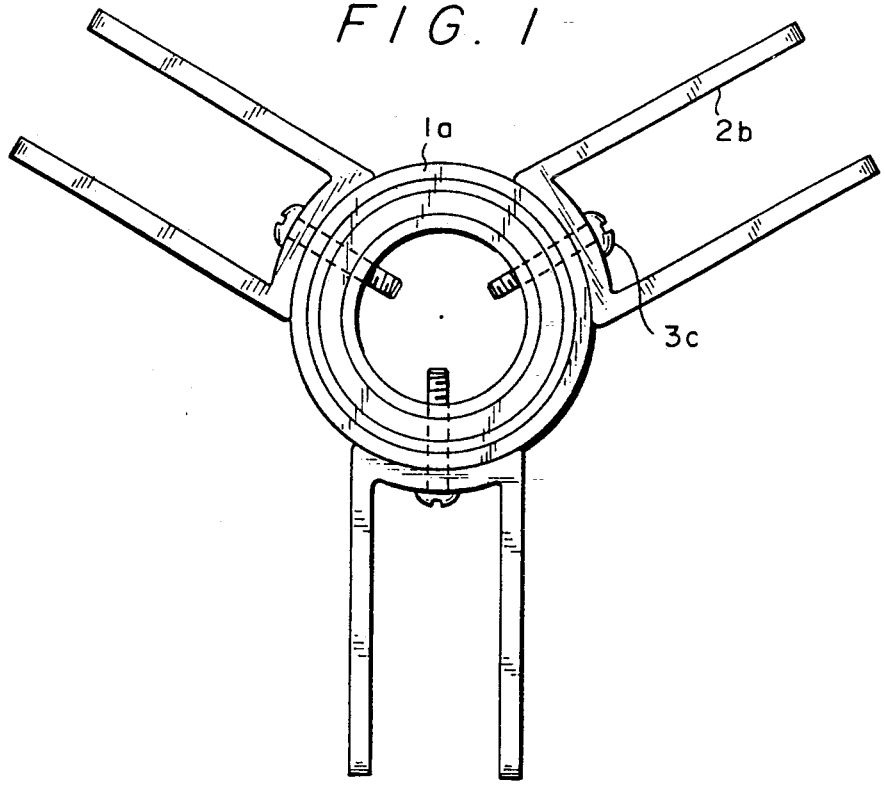
FIG. 1 is a plan view of a floor lamp tripod stand according to the prior art.
Figure 3:
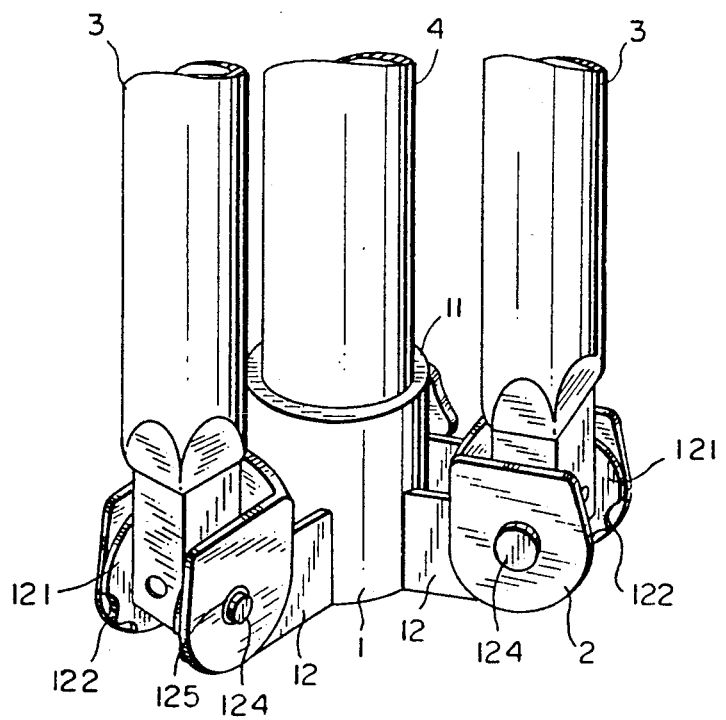
FIG. 3 is a perspective assembly view of the floor lamp tripod stand of FIG. 2.

Referring to FIGS. 2 and 3 and FIG. 4 again, the socket 1 has three mounting frames 12 equiangularly spaced around a socket body 11 thereof on the outside. The socket body 11 has a center hole 111 through its length into which the support arm 4 of the floor lamp is inserted, an inward annular bottom flange 112 on one end of the center hole 111 for stopping the support arm 4 of the floor lamp, and a screw hole 113 on the peripheral wall thereof into which a tightening up screw 114 is threaded to tighten up the support arm 4 of the floor lamp in position. Each mounting frame 12 is consisted two symmetrical wings 121 perpendicularly extended from the outside wall of the socket body 11, each of which has a series of locating notches 122 around the respective peripheral edge and a pin hole 123 at a suitable location. Each locking plate 2 is respectively made from a plastic material through the process of injection molding, having a top finger press portion 21 on a top wall thereof, an extension strip 22 extended from the top finger press portion 21 and defined within two elongated grooves 25 and terminated into a locating rod 23 and two symmetrical presser strips 24, and two opposite pin holes 26 on two opposite side walls thereof. Each leg 3 has an opening 31 on one side adjacent to a top end thereof, a curved spring plate 32 fastened inside the opening 31 through a rivet joint, an oval slot 34 across the opening 31 into which a round rod 35 is inserted and retained in place by the curved spring plate 32, a pin hole 33 across the opening 31 below the oval slot 34. By inserting the two symmetrical wings 121 of either mounting frame 12 in the two elongated grooves 25, and then inserting a headed pivot pin 124, which has an annular groove 124a around the peripheral surface adjacent to the plain end thereof, through the pin holes 26 on either locking plate 2, the pin hole 33 on either leg 3 and the pin hole 123 on each wing 121 of either mounting frame 12 and then clamping a clamp 125 on the annular groove 124a on the headed pivot pin 124, either leg 3 and either locking plate 2 are respectively and pivotably connected to either mounting frame 12 of the socket 1.

Figure 5A:
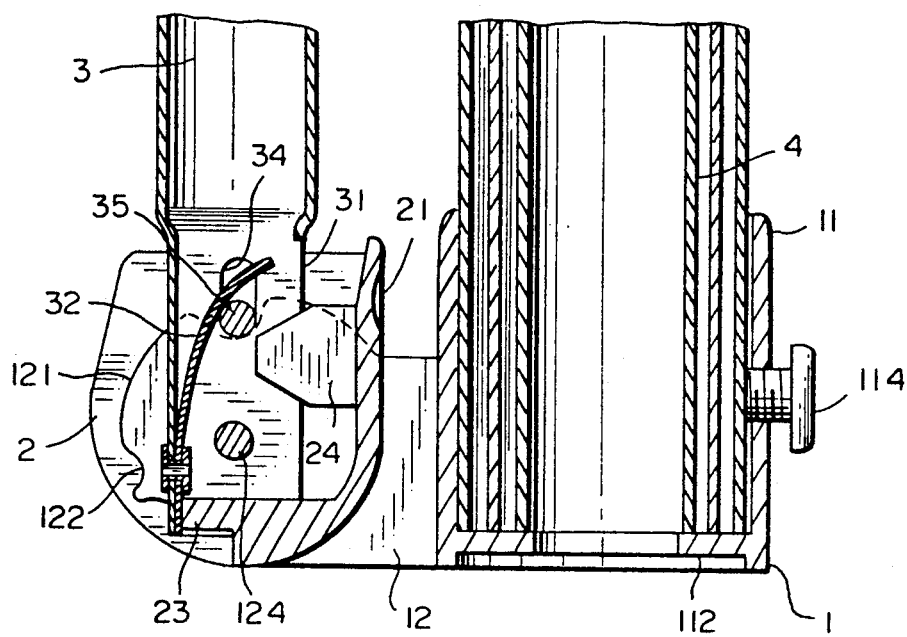
FIG. 5A is a cross section of the floor lamp tripod stand according to the present invention showing a leg is locked in parallel with the support arm.
Figure 5B:
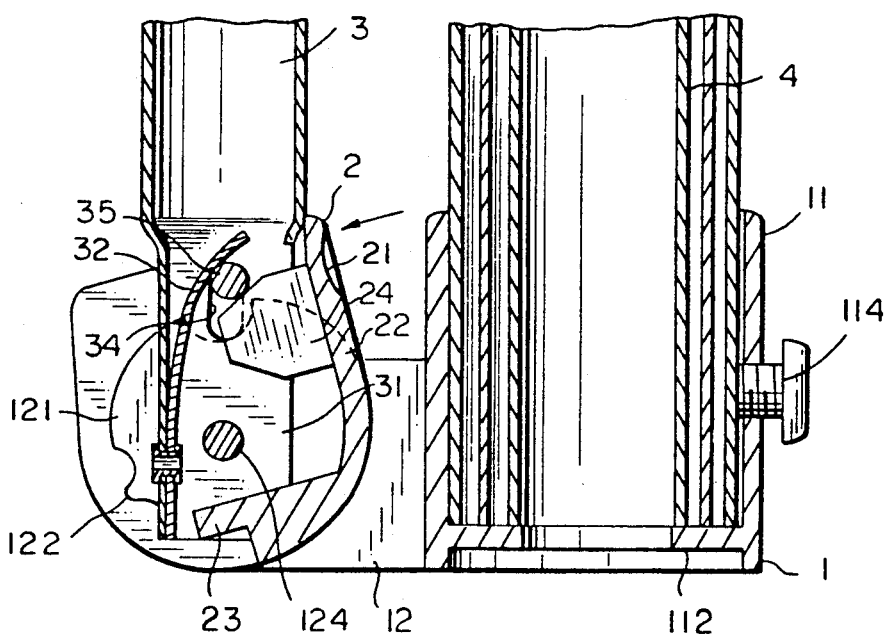
FIG. 5B is another cross section of the floor lamp tripod stand of FIG. 5A showing the leg unlocked for changing its angular position.
Figure 5C:
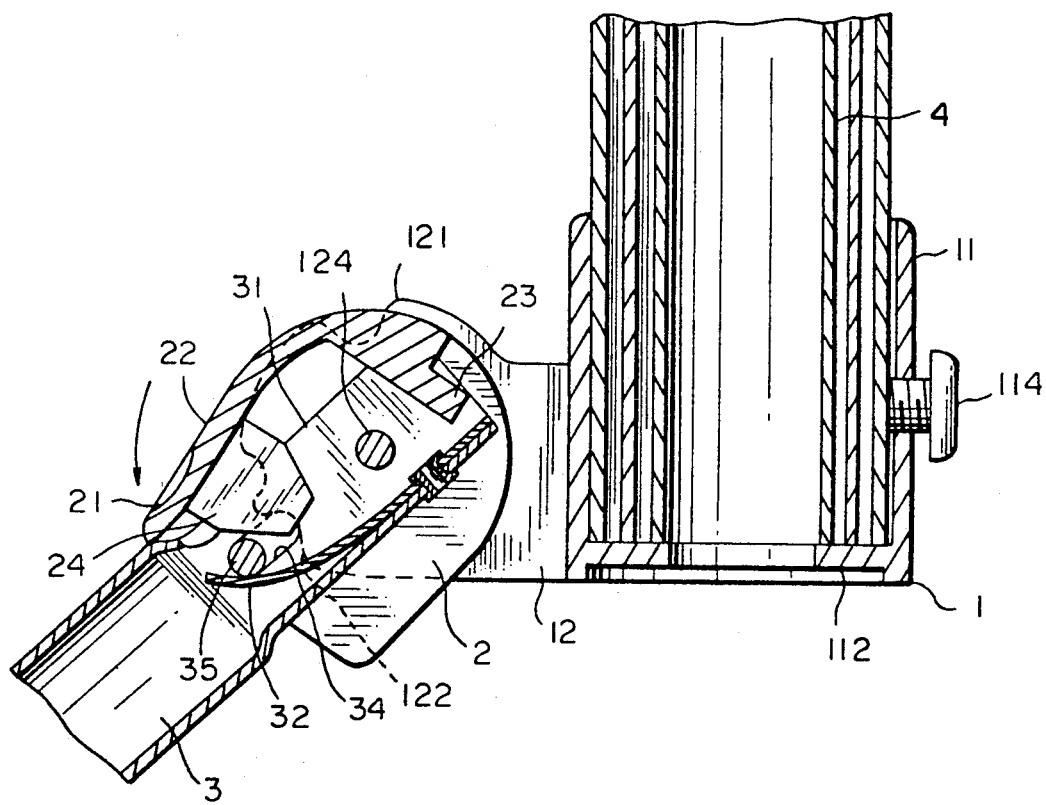
FIG. 5C is still another cross section of the floor lamp tripod stand of FIG. 5A showing the leg locked in another angular position for supporting the support arm on the ground.

Referring to FIGS. 5A, 5B and 5C, pressing the finger panel 21 with the fingers causes the symmetrical presser strips 24 to move the round rod 35 in the oval slot 34 against the curved spring plate 32 for permitting the round rod 35 to be released from the respective locating notches 122 on the respective mounting frame 12, and therefore the round rod 35 can be locked in any of other locating notches 122 on each wing 121 of the respective mounting frame 12 for permitting the respective leg 3 to be adjusted to the desired angular position on the socket 1 relative to the support arm 4.

What is claimed is:

1. A tripod stand for a floor lamp including a socket fastened to a support arm for said floor lamp, three legs respectively and pivotably connected to said socket, a pivot pin interconnecting said legs and said socket and a clamp for supporting said support arm in said socket, and three locking plates for respectively locking said legs in predetermined angular positions relative to said socket and support arm, wherein:

said socket comprising three mounting frames equiangularly spaced around an outside surface of said socket, said socket further having an upwardly opening center hole for receiving said support arm, and a stop plate mounted on said socket closing the bottom of the center hole for supporting said support arm in said socket, and a set screw and hole provided through a peripheral wall of said socket to fasten said support arm in said socket; each mounting frame having two symmetrical wings perpendicularly extended outwards from said socket, each wing having a series of locating notches around a respective peripheral edge and a pin hole therethrough;

each of said locking plates having a top finger press portion on a top wall thereof, an extension strip extended from the top finger press portion and a locating rod and two symmetrical presser strips at the distal portion thereof, and a pair of opposed holes on two opposite side walls thereof bilaterally aligned with the pin holes on the two symmetrical wings of the respective mounting frame on the outside thereof and interconnected by said pivot pin;

each leg having a side opening on one side adjacent said socket, a curved spring plates fastened inside said side opening, an oval slot across said side opening, a rod inserted in said oval slot and releasably locked in either locating notch on each wing of the respective mounting frame by said curved spring plate, a pin hole extending across the side opening below said oval slot in said leg connected between the holes on the two symmetrical wings of the respective mounting frame by said pivot pin;

whereby pressing the finger press portion on either locking plate causes the respective symmetrical presser strips to move the rod of the respective locking plate in the respective oval slot against the respective curved spring plate for permitting the respective rod to be moved from one locating notch on each wing of the respective mounting frame to another, allowing the respective leg to be adjusted to any of a series of angular positions on said socket relative to said support arm of said floor lamp.

* * * * *